(12) United States Patent
Ullrich et al.

(10) Patent No.: US 9,905,090 B2
(45) Date of Patent: Feb. 27, 2018

(54) AUTOMATIC FITTING OF HAPTIC EFFECTS

(71) Applicant: Immersion Corporation, San Jose, CA (US)

(72) Inventors: Christopher J. Ullrich, Ventura, CA (US); Danny Grant, Laval (CA); Victor Aaron Viegas, Atherton, CA (US); Juan Manuel Cruz-Hernandez, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/240,560

(22) Filed: Aug. 18, 2016

(65) Prior Publication Data

US 2016/0358429 A1    Dec. 8, 2016

Related U.S. Application Data

(63) Continuation of application No. 14/271,536, filed on May 7, 2014, now Pat. No. 9,449,043, which is a continuation of application No. 13/788,487, filed on Mar. 7, 2013, now Pat. No. 8,754,758, which is a
(Continued)

(51) Int. Cl.
| | |
|---|---|
| *G06F 17/30* | (2006.01) |
| *G08B 6/00* | (2006.01) |
| *G06F 3/01* | (2006.01) |
| *G06F 3/16* | (2006.01) |

(Continued)

(52) U.S. Cl.
CPC ............. *G08B 6/00* (2013.01); *A63F 13/285* (2014.09); *A63F 13/424* (2014.09); *G06F 3/016* (2013.01); *G06F 3/165* (2013.01); *G06F 17/30386* (2013.01); *G06F 17/30516* (2013.01); *G06F 2203/013* (2013.01); *G06F 2203/014* (2013.01)

(58) Field of Classification Search
CPC ........ G08B 6/00; A63F 13/285; A63F 13/424; G06F 3/016; G06F 3/165; G06F 17/30386; G06F 17/30516; G06F 2203/013; G06F 2203/014
See application file for complete search history.

(56) References Cited

U.S. PATENT DOCUMENTS

| | | | |
|---|---|---|---|
| 7,979,146 | B2 | 7/2011 | Ullrich et al. |
| 8,000,825 | B2 | 8/2011 | Ullrich et al. |
| 8,378,964 | B2 | 2/2013 | Ullrich et al. |

(Continued)

FOREIGN PATENT DOCUMENTS

EP    2487557 A2    8/2012

OTHER PUBLICATIONS

Satvir Singh Bhatia et al., U.S. Appl. No. 13/661,140, filed Oct. 26, 2012.

(Continued)

*Primary Examiner* — Brian Zimmerman
*Assistant Examiner* — Sara Samson
(74) *Attorney, Agent, or Firm* — Medler Ferro Woodhouse & Mills PLLC

(57) ABSTRACT

A system is provided that automatically generates one or more haptic effects from source data, such as audio source data. The system fits the one or more haptic effects to the source data by analyzing the source data and identifying one or more haptic effects that are the most similar to the source data. The system matches the identified one or more haptic effects with the source data. The system subsequently outputs the identified one or more haptic effects.

20 Claims, 6 Drawing Sheets

Related U.S. Application Data continuation of application No. 13/785,166, filed on Mar. 5, 2013, now Pat. No. 8,754,757.

(51) Int. Cl.
    *A63F 13/285*    (2014.01)
    *A63F 13/424*    (2014.01)

(56) References Cited

U.S. PATENT DOCUMENTS

| | | |
|---|---|---|
| 2003/0067440 A1 | 4/2003 | Rank |
| 2003/0189748 A1 | 10/2003 | Wang |
| 2007/0242040 A1 | 10/2007 | Ullrich et al. |
| 2009/0189748 A1 | 7/2009 | Bergere |
| 2011/0102160 A1 | 5/2011 | Heubel et al. |
| 2011/0202155 A1 | 8/2011 | Ullrich et al. |
| 2011/0215913 A1 | 9/2011 | Ullrich et al. |
| 2012/0206246 A1 | 8/2012 | Cruz-Hernandez et al. |
| 2012/0206247 A1 | 8/2012 | Bhatia et al. |
| 2013/0131851 A1 | 5/2013 | Ullrich et al. |
| 2013/0207917 A1 | 8/2013 | Cruz-Hernandez et al. |
| 2013/0265286 A1 | 10/2013 | Da Costa et al. |
| 2013/0335209 A1 | 12/2013 | Cruz-Hernandez et al. |
| 2014/0064516 A1 | 3/2014 | Cruz-Hernandez et al. |

OTHER PUBLICATIONS

Christopher J. Ullrich et al., U.S. Appl. No. 13/785,166, filed Mar. 5, 2013.
Amaya Becvar Weddle et al., U.S. Appl. No. 14/019,606, filed Sep. 6, 2013.
Jamal Saboune et al., U.S. Appl. No. 14/020,461, filed Sep. 6, 2013.
Jamal Saboune et al., U.S. Appl. No. 14/020,502, filed Sep. 6, 2013.
Any information that is not included with this Information Disclosure Statement can be found in U.S. Appl. No. 13/785,16, U.S. Appl. No. 13/788,487, and U.S. Appl. No. 14/271,536.
Notification of Reasons of Refusal issued in Japanese Appl. No. 2014-027455, dated Sep. 25, 2017.
Office Action issued in Chinese Appl. No. 201410076907.6, dated Sep. 25, 2017.

AUTOMATIC FITTING OF HAPTIC EFFECTS

CROSS-REFERENCE TO RELATED APPLICATIONS

This application is a continuation of U.S. patent application Ser. No. 14/271,536, filed on May 7, 2014, which is a continuation of U.S. patent application Ser. No. 13/788,487, filed on Mar. 7, 2013 and issued as U.S. Pat. No. 8,754,758, which is a continuation of U.S. patent application Ser. No. 13/785,166, filed on Mar. 5, 2013 and issued as U.S. Pat. No. 8,754,757, all of which are herein incorporated by reference in their entireties.

FIELD

One embodiment is directed generally to haptic effects, and more particularly, to a device that produces haptic effects in association with other related output.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

Devices can be configured to coordinate the output of haptic effects with the output of other content, such as games or other media, so that the haptic effects are incorporated into the other content. For example, in a gaming context, when a game is developed, an audio effect developer can develop audio effects that are associated with the game and represent an action occurring within the game, such as machine gun fire, explosions, or car crashes. Typically, haptic effects are added to the game late in the game development process, such as when the game developer is finishing development of the game application, or when the game developer ports the finished game application to a new platform. This generally results in the phenomena where haptic effects are added after all the audio effects have been developed. Because haptic effects are typically added so late in the process, it generally falls on the haptic effect developer, or some other developer, to make a decision regarding associating a haptic effect with an audio effect. Further, an audio effect developer typically does not have input regarding a selection of an appropriate haptic effect for an audio effect. This can contribute to a degradation of the quality of haptic effects that are ultimately incorporated into the content. This quality degradation can be a barrier to incorporating high-quality haptic effects into such content.

SUMMARY

One embodiment is a system that automatically fits a haptic effect. The system receives source data, where the source data includes one or more characteristics. The system further compares the source data with one or more haptic primitives, where each haptic primitive of the one or more haptic primitives includes one or more haptic parameters. The system further selects one or more haptic primitives from the one or more haptic primitives based on the comparison. The system further outputs one or more haptic effects based on the selected one or more haptic primitives.

Another embodiment is a system that automatically fits a haptic effect. The system receives source data, where the source data includes one or more features. The system further extracts one or more features from the source data. The system further compares the one or more extracted features with one or more templates, where each template includes one or more template features and one or more haptic effects. The system further selects one or more templates from the one or more templates based on the comparison. The system further selects the one or more haptic effects from the one or more selected templates. The system further outputs the one or more selected haptic effects.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is a system that can automatically generate one or more haptic effects given source data, such as audio source data. In other words, the system can automatically convert received source data into haptic information, where the received source data can include data, such as audio data, video data, acceleration data, or another type of data that can be captured with a sensor. More specifically, the system can analyze the source data and identify one or more haptic effects that are the most similar to the source data. The system can then match the identified one or more haptic effects with the source data. The system can subsequently output the identified one or more haptic effects. The source data can be stored in a storage, where the source data is retrieved before the source data is automatically converted into haptic information. Alternatively, the source data can be streamed before the source data is automatically converted into haptic information.

In one embodiment, the system can identify one or more haptic primitives (described in greater detail below) that are the most similar to the source data. The system can then select the one or more haptic primitives and output one or more haptic effects based on the one or more haptic primitives. The system can optionally optimize the one or more haptic primitives to be more similar to the source data. In another embodiment, the system can identify one or more templates that are the most similar to the source data. The system can then select the one or more haptic effects that are associated with the one or more templates, and output the one or more selected haptic effects. The system can optionally optimize the one or more selected haptic effects to be more similar to the source data. The source data can be stored in a storage, where the source data is retrieved before the source data is automatically converted into haptic information. Alternatively, the source data can be streamed before the source data is automatically converted into haptic information.

Thus, according to an embodiment, where content, such as a video game or other type of media, is output, and where the content includes data, such as audio data, video data, or acceleration data, the system can automatically add one or more haptic effects to the content, where each haptic effect "fits" the corresponding data of the content. Thus, when the existing content is output, haptic content can automatically be added to the existing content, where the haptic content matches the existing content.

Figure 1:
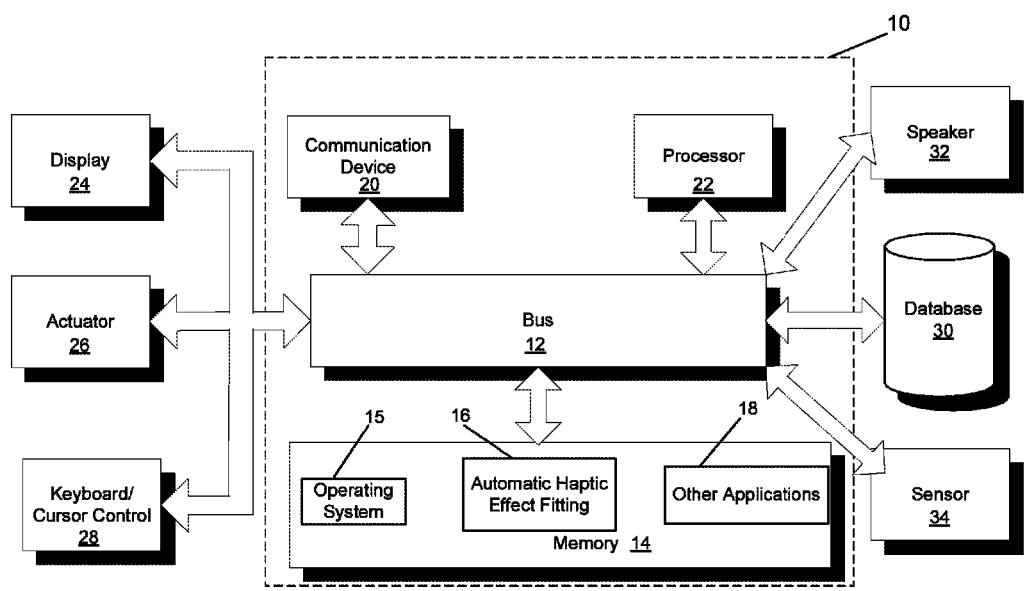
FIG. 1 illustrates a block diagram of a system in accordance with one embodiment of the invention.

FIG. 1 illustrates a block diagram of a system 10 in accordance with one embodiment of the invention. In one embodiment, system 10 is part of a device, and system 10 provides an automatic haptic effect fitting functionality for the device. In another embodiment, system 10 is separate from the device, and remotely provides the automatic haptic effect fitting functionality for the device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a device in one embodiment. The modules further include an automatic haptic effect fitting module 16 that automatically fits a haptic effect, as disclosed in more detail below. In certain embodiments, automatic haptic effect fitting module 16 can comprise a plurality of modules, where each individual module provides specific individual functionality for automatically fitting a haptic effect. System 10 will typically include one or more additional application modules 18 to include additional functionality, such as the Integrator™ application by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touchscreen, configured to send and receive signals from processor 22, and may be a multi-touch touchscreen. Processor 22 may be further coupled to a keyboard or cursor control 28 that allows a user to interact with system 10, such as a mouse or a stylus.

System 10, in one embodiment, further includes an actuator 26. Processor 22 may transmit a haptic signal associated with a generated haptic effect to actuator 26, which in turn outputs haptic effects such as vibrotactile haptic effects, electrostatic friction haptic effects, or deformation haptic effects. Actuator 26 includes an actuator drive circuit. Actuator 26 may be, for example, an electric motor, an electromagnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1). Actuator 26 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 26 can be replaced by some other type of haptic output device. Further, in other alternate embodiments, system 10 may not include actuator 26, and a separate device from system 10 includes an actuator, or other haptic output device, that generates the haptic effects, and system 10 sends generated haptic effect signals to that device through communication device 20.

System 10 can further be operatively coupled to a database 30, where database 30 can be configured to store data used by modules 16 and 18. Database 30 can be an operational database, an analytical database, a data warehouse, a distributed database, an end-user database, an external database, a navigational database, an in-memory database, a document-oriented database, a real-time database, a relational database, an object-oriented database, or any other database known in the art.

In one embodiment, system 10 further includes one or more speakers 32. Processor 22 may transmit an audio signal to speaker 32, which in turn outputs audio effects. Speaker 32 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

System 10, in one embodiment, further includes a sensor 34. Sensor 34 can be configured to detect a form of energy, or other physical property, such as, but not limited to, acceleration, bio signals, distance, flow, force/pressure/strain/bend, humidity, linear position, orientation/inclination, radio frequency, rotary position, rotary velocity, manipulation of a switch, temperature, vibration, or visible light intensity. Sensor 34 can further be configured to convert the detected energy, or other physical property, into an electrical signal, or any signal that represents virtual sensor information. Sensor 34 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense $CPS^2$ 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, or a light-dependent resistor.

Figure 2:
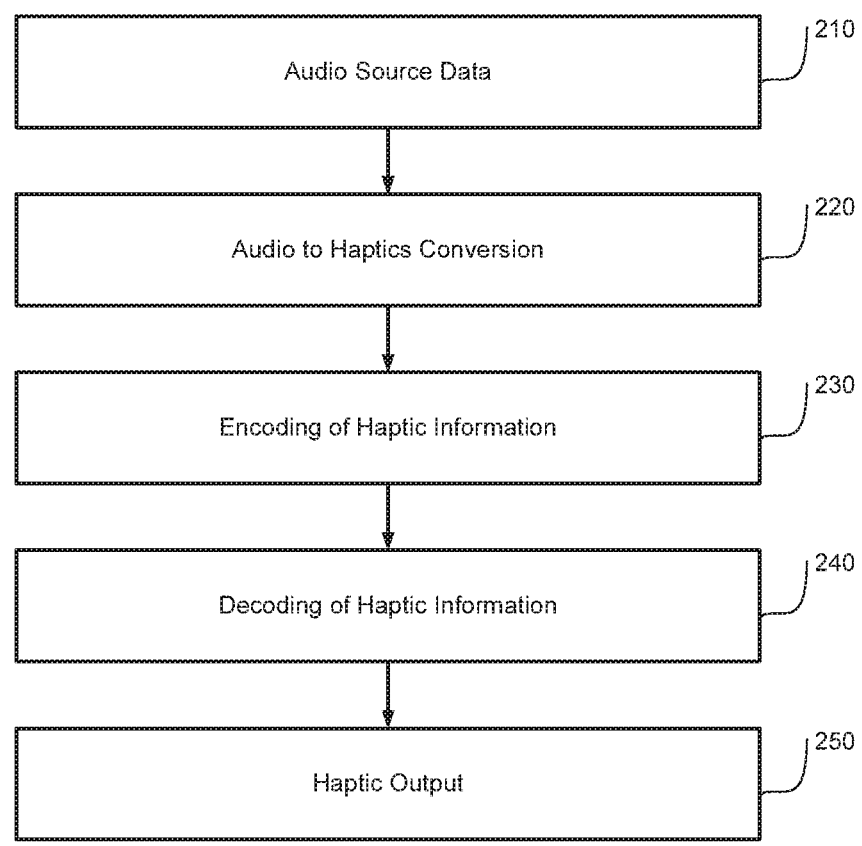
FIG. 2 illustrates a flow diagram of a framework for generating and playing a haptic effect.

FIG. 2 illustrates a flow diagram of a framework for generating and outputting a haptic effect, where the haptic effect is generated based on an audio input, according to one embodiment of the invention. In one embodiment, the functionality of FIG. 2, as well as the functionalities of FIGS. 3, 4, 5, and 6, are each implemented by software stored in memory or another computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. Furthermore, in alternate embodiments, each functionality may be performed by hardware using analog components.

FIG. 2 illustrates audio source data 210. According to the embodiment, audio source data 210 includes audio data. In certain embodiments, the audio data included within audio source data 210 can be audio data that is stored in either an audio file or an audio signal. In an alternate embodiment, audio source data 210 can be replaced by the audio file or the audio signal. In other embodiments, the audio data included within audio source data 210 can be audio data that is streamed. Further, in the illustrated embodiment, audio source data 210 is encoded in a pulse code modulation ("PCM") format. In certain embodiments, audio source data 210 can also be encoded in another type of format, such as a Musical Instrument Digital Interface ("MIDI") format, or a MPEG-2 Audio Layer III ("MP3") format. In addition, in embodiments where audio source data 210 is encoded in another type of format, audio source data 210 can include audio data that can be decoded into a PCM format. Further, in these embodiments, audio source data 210 can also include un-decoded data that can be used in generating a haptic effect based on audio source data 210, as described below in greater detail. For example, where audio source data 210 is encoded in an MP3 format, audio source data 210 can include one or more Fourier coefficients for the audio data, where the one or more Fourier coefficients can be directly used to generate a haptic effect based on audio source data 210. As another example, where audio source data 210 is encoded in a MIDI format, audio source data 210 can include a pre-existing set of metadata about the audio data that can be directly used to generate a haptic effect based on audio source data 210. Such metadata can include metadata related to a source of the audio data, such as a position or orientation of a sensor that captures the audio data. Such metadata can be used by a matching algorithm to generate a haptic effect based on audio source data 210, as discussed below in greater detail.

Further, in alternate embodiments, audio source data 210 can be replaced by another type of source data that includes another type of data, such as video source data that includes video data, acceleration source data that includes acceleration data, orientation source data that includes orientation data, ambient light source data that includes ambient light data, or another type of source data. An example of another type of source data is source data that includes data that can be captured with a sensor. Further, in some embodiments, audio source data 210 can be replaced by source data that includes multi-modal data (i.e. data of two or more modes, or types, such as audio data and video data).

At 220, source data 210 is automatically converted to haptic information, such as haptic data or a haptic stream. According to the embodiment, the haptic information can include either a single haptic effect, or a plurality of haptic effects, that can be output by a device. In certain embodiments, audio source data 210 can be automatically converted to haptic information by comparing audio source data 210 to a set of haptic primitives, and selecting at least one haptic primitive that is most similar to audio source data 210, as is further described below in relation to FIG. 3. In other embodiments, audio source data 210 can be automatically converted to haptic information by comparing audio source data 210 to a set of templates, selecting at least one template that is most similar to audio source data 210, and selecting at least one haptic effect that is associated with the at least one selected template, as is further described below in relation to FIG. 4.

At 230, the haptic information generated at 220 can be encoded. The haptic information can be encoded according to any haptic encoding technique known to one of ordinary skill in the art. For example, the haptic information can be encoded using a haptic effect signal. The haptic effect signal can subsequently be persisted on a disk, memory, or other computer-readable storage medium. As another example, the haptic information can be encoded using a haptic effect file. The haptic effect file can have one of many different formats. In certain embodiments, the haptic effect file can have an extensible markup language ("XML") format, such as an Immersion Vibration Source ("IVS") haptic effect file. In certain other embodiments, the haptic effect file can have a binary format, such as an Immersion Vibration Target ("IVT") haptic effect file. The haptic information encoded at 230 can be further compressed and/or included in one or more asset archives used in a computer application.

At 240, the haptic information encoded at 230 can be decoded. The haptic information can be decoded according to any haptic decoding technique known to one of ordinary skill in the art. By decoding the haptic information, the haptic information can be converted from an encoded format, such as a haptic effect signal or a haptic effect file, into a format where the haptic information can be interpreted, and a single haptic effect, or a plurality of haptic effects, can be output based on the haptic information.

At 250, the haptic information decoded at 240 can be output. The haptic information can be output according to any haptic output technique known to one of ordinary skill in the art. For example, the haptic information can be output in the form of a single haptic effect, or a plurality of haptic effects, that can be output by a mobile device, a game pad, or a wearable haptic device. Further, the haptic effect(s) can produce any type of haptic feedback, such as vibrations, deformations, electrostatic sensations, or kinesthetic sensations. A single haptic effect generator, such as an actuator, can be used to output the haptic effect(s), or multiple haptic effect generators can be used. Thus, in this embodiment, any haptic effect that is generated from audio source data 210 can be encoded and persisted for later usage. However, in alternate embodiments, a single haptic effect, or a plurality of haptic effects, can be generated from audio source data 210 and output in real-time.

Figure 3:
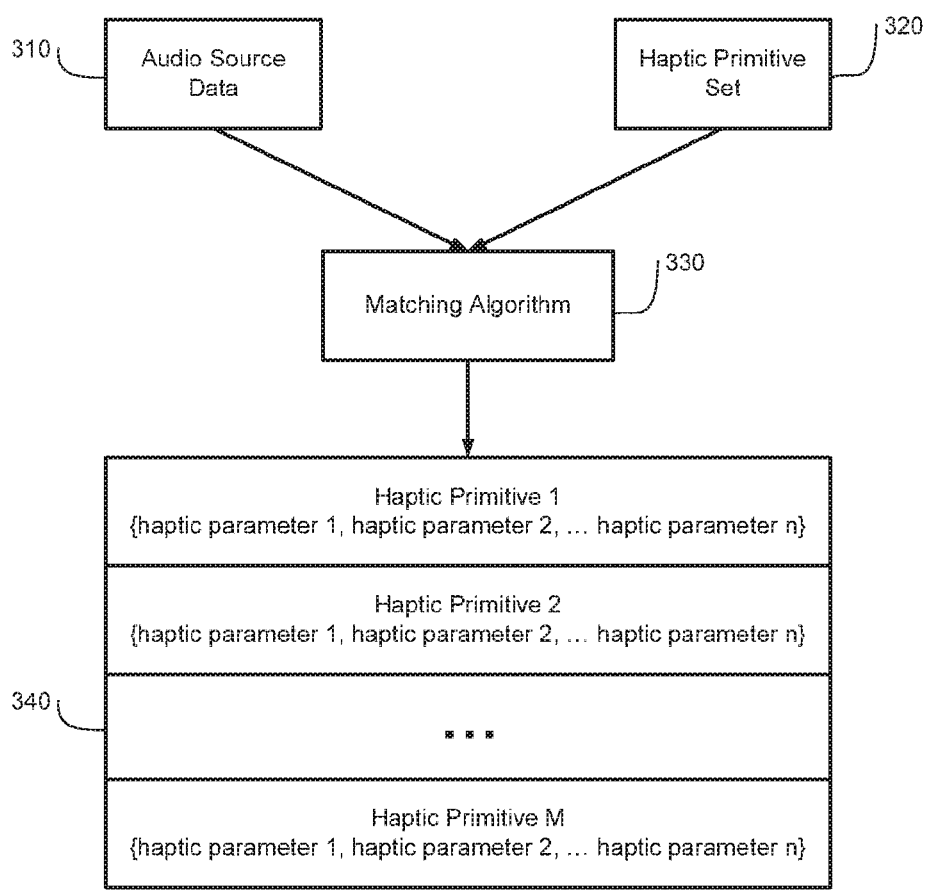
FIG. 3 illustrates a flow diagram of a selection of a haptic primitive that is most similar to audio source data, according to one embodiment of the invention.

FIG. 3 illustrates a flow diagram of a selection of a haptic primitive that is most similar to audio source data, according to one embodiment of the invention. FIG. 3 illustrates audio source data 310. According to the embodiment, audio source data 310 includes audio data. In certain embodiments, the audio data included within audio source data 310 can be audio data that is stored in either an audio file or an audio signal. In other embodiments, the audio data included within audio source data 310 can be audio data that is streamed. Further, in the illustrated embodiment, audio source data 310 is encoded in a PCM format. In certain embodiments, audio source data 310 can also be encoded in another type of format, such as a MIDI format, or an MP3 format. Further, in alternate embodiments, audio source data 310 can be replaced by another type of source data that includes another type of data, such as video source data that includes video data, acceleration source data that includes acceleration data, orientation source data that includes orientation data, ambient light source data that includes ambient light data, or another type of source data that includes another type of data. An example of another type of source data is source data that includes data that can be captured with a sensor. Further, in some embodiments, audio source data 310 can be replaced by source data that includes multi-modal data.

Further, audio source data 310 can include characteristics. A characteristic of audio source data 310 is a physical characteristic of audio source data 310, such as a physical characteristic of audio data stored in an audio signal, where audio source data 310 includes data stored in an audio signal, or a physical characteristic of audio data stored in an audio file, where audio source data 310 includes data stored in an audio file. A specified subset of characteristics of audio source data 310 can be classified as significant characteristics. Examples of significant characteristics of audio source data 310 can include: amplitude, frequency, duration, envelope, density, magnitude, and strength. A characteristic can include a numeric value, where the numeric value can define a characteristic of audio source data 310.

FIG. 3 further illustrates a haptic primitive set 320, where haptic primitive set 320 includes haptic primitives. A haptic primitive is a definition of a haptic effect that can be generated. For example, a haptic primitive can include a definition for a periodic haptic effect that is 50 milliseconds ("ms") in duration, has a 10 ms attack portion, has a 5 ms sustain portion, and has an 8 ms decay portion. In certain embodiments, haptic primitive set 320 can include a single haptic primitive. As part of the definition of the haptic effect, a haptic primitive can further optionally include haptic parameters, where a haptic parameter is a parameter that can define a haptic signal used to generate a haptic effect, and thus, can also define the haptic effect to be generated. In certain embodiments, a haptic primitive can include a single haptic parameter. More specifically, a haptic parameter is a quantity of a haptic effect quality, such as magnitude, frequency, duration, amplitude, strength, envelope, density, or any other kind of quantifiable haptic parameter. According to the embodiment, a haptic effect can be defined, at least in part, by the one or more haptic parameters, where the one or more haptic parameters can define characteristics of the haptic effect. A haptic parameter can include a numeric value, where the numeric value can define a characteristic of the haptic signal, and thus, can also define a characteristic of the haptic effect generated by the haptic signal. Thus, each haptic primitive of haptic primitive set 320 can include one or more numeric values, where the one or more numerical values can parameterize a haptic effect. Examples of haptic parameters can include: an amplitude haptic parameter, a frequency haptic parameter, a duration haptic parameter, an envelope haptic parameter, a density haptic parameter, a magnitude haptic parameter, and a strength haptic parameter.

According to the embodiment, an amplitude haptic parameter can define an amplitude of a haptic signal used to generate a haptic effect, and thus, can define an amplitude of the haptic effect. A frequency haptic parameter can define a frequency of a haptic signal used to generate a haptic effect, and thus, can define a frequency of the haptic effect. A duration haptic parameter can define a duration of a haptic signal used to generate a haptic effect, and thus, can define a duration of the haptic effect. An envelope haptic parameter can define an envelope of a haptic signal used to generate a haptic effect, and thus, can define an envelope of the haptic effect. A density haptic parameter can define a density of a haptic signal used to generate a haptic effect, and thus, can define a density of the haptic effect. A magnitude haptic parameter can define a magnitude of a haptic signal used to generate a haptic effect, and thus, can define a magnitude of the haptic effect. A strength haptic parameter can define a strength of a haptic signal used to generate a haptic effect, and thus, can define a strength of the haptic effect.

FIG. 3 illustrates a matching algorithm 330 that receives audio source data 310 and haptic primitive set 320 as input. According to the embodiment, matching algorithm 330 is an algorithm that can compare audio source data 310 with each haptic primitive included within haptic primitive set 320, and can select one or more haptic primitives of haptic primitive set 320 that are most similar to audio source data 310. In certain embodiments, matching algorithm 330 can also optionally optimize the selected one or more haptic primitives of haptic primitive set 320 so that they are more similar to audio source data 310, as is further described below in greater detail.

According to an embodiment, matching algorithm 330 can first identify significant characteristics (or a single significant characteristic) of audio source data 310. Further, for each haptic primitive of haptic primitive set 320, matching algorithm 330 can identify haptic parameters (or a single haptic parameter). Matching algorithm 330 can further compare the haptic parameters of each haptic primitive to the significant characteristics of audio source data 310. By comparing the haptic parameters to the significant characteristics, matching algorithm 330 can determine how similar the haptic parameters are to the significant characteristics. In comparing the haptic parameters of each haptic primitive with the significant characteristics of audio source data 310, matching algorithm 330 can identify a haptic parameter for each haptic primitive that corresponds to the significant characteristic of audio source data 310, and can further compare the identified significant characteristic with the corresponding identified haptic parameter. For example, matching algorithm 330 can identify an amplitude characteristic of audio source data 310, and can further identify an amplitude haptic parameter of a haptic primitive of haptic primitive set 320. Matching algorithm 330 can then further compare the identified amplitude characteristic and the corresponding identified amplitude haptic parameter.

In comparing a significant characteristic with a corresponding haptic parameter, matching algorithm 330 can compare a value of the significant characteristic with a value of the corresponding haptic parameter. By comparing a value of the haptic parameter to a value of the corresponding significant characteristic, matching algorithm 330 can determine how similar the value of the haptic parameter is to the value of the significant characteristic. Matching algorithm 330 can then select the haptic primitives (or the single haptic primitive) from haptic primitive set 320 in which the values of haptic parameters are most similar to the values of the significant characteristics of audio source data 310.

Matching algorithm 330 can use any comparison metric to determine which haptic primitive is (or which haptic primitives are) the most similar to audio source data 310. More specifically, matching algorithm 330 can use any comparison metric in order to determine which haptic parameters for a specific haptic primitive are most similar to the significant characteristics of audio source data 310. As an example, matching algorithm 330 can, for each haptic primitive of haptic primitive set 320, determine a number of haptic parameters whose values are identical to values of their corresponding significant characteristics of audio source data 310, and can select a haptic primitive that includes a highest number of haptic parameters whose values are identical to values of their corresponding significant characteristics of audio source data 310. As another example, matching algorithm 330 can, for each haptic primitive of haptic primitive set 320, calculate a deviation between a value of each haptic parameter and a value of its corresponding characteristic of audio source data 310, calculate a mean or total deviation for the haptic primitive, and can further select a haptic primitive with the lowest mean or total deviation. These are only example comparison metrics, and, in alternate embodiments, matching algorithm 330 can use alternate comparison metrics to determine which haptic primitive is (or which haptic primitives are) most similar to audio source data 310. Further, matching algorithm 330 can use an optimization algorithm to maximize or minimize a comparison metric across all haptic primitives of haptic primitive set 320 (including each haptic parameter of each haptic primitive). Examples of such optimization algorithms are readily appreciated by one of ordinary skill in the relevant art.

In one embodiment, as previously described, matching algorithm 330 can optionally optimize the selected haptic primitives (or the selected single haptic primitive) of haptic primitive set 320. According to the embodiment, by optimizing each selected haptic primitive, matching algorithm 330 can adjust a value of a single haptic parameter (or a plurality of haptic parameters) of each selected haptic primitive to be more similar to a value of a corresponding characteristic of audio source data 310. The adjusting of the value(s) can be an upward adjustment or a downward adjustment. This can produce a refinement of the haptic parameter(s) of each selected haptic primitive of haptic primitive set 320. The refinement of the haptic parameter(s) can, thus, refine each selected haptic primitive of haptic primitive set 320, so that each selected haptic primitive is more similar to audio source data 310.

FIG. 3 illustrates an ordered haptic primitive set 340, where ordered haptic primitive set 340 is output that is produced by matching algorithm 330. According to the embodiment, ordered haptic primitive set 340 includes a set of haptic primitives (i.e., haptic primitive 1, haptic primitive 2, . . . haptic primitive M), where the haptic primitives are ordered based on how similar the haptic primitives are to audio source data 310. In certain embodiments, ordered haptic primitive set 340 includes all the haptic primitives included within haptic primitive set 320. In other alternate embodiments, ordered haptic primitive set 340 only includes the haptic primitives included with haptic primitive set 320 that matching algorithm 330 identifies as being most similar to audio source data 310 (i.e., the haptic primitives in which values of the haptic parameters of the haptic primitive are most similar to values of the characteristics of audio source data 310). In certain embodiments, matching algorithm 330 can assign a score to each haptic primitive of ordered haptic primitive set 340, where the score identifies how similar each haptic primitive is to audio source data 310. Thus, each haptic primitive of ordered haptic primitive set 340 can be selected from haptic primitive set 320 and ordered based on its assigned score. One or more haptic effects can subsequently be generated from each haptic primitive of ordered haptic primitive set 340. The one or more haptic effects can subsequently be transmitted, stored, or broadcast. Subsequently, the one or more haptic effects can be output. In alternate embodiments, the one or more haptic effects can be output after they are generated.

An example of selecting a haptic primitive that is most similar to audio source data is now described. In the example, audio source data 310 can include data stored within an audio file associated with a firing of a shotgun in a video game, where the data included in audio source data 310 is stored in a waveform audio file format ("WAV"). Matching algorithm 330 can process audio source data 310 and determine characteristics of audio source data 310, such as duration, frequency, content, and/or envelope. Given these parameters, matching algorithm 330 can assess a set of haptic primitives stored within haptic primitive set 320 to determine a best match to audio source data 310. In this example where audio source data 310 includes audio data associated with a gunshot audio effect, the duration can be short, and a magnitude envelope could feature two distinct parts (e.g., an impulse-like loud noise followed by a longer envelope for an echo of the gunshot), where the two distinct parts could include distinctive frequency content. In embodiments where the audio is best matched with two or more haptic primitives that are played sequentially, or with some overlap, matching algorithm 330 can segment audio source data 310 and iterate on the segments of audio source data 310 in order to identify a good match.

According to the example, a first section of the available haptic primitives of haptic primitive set 320 can be based on a duration of audio source data 310. A haptic primitive (and thus, a haptic effect) can be selected. Once the haptic primitive is selected, the haptic primitive (and thus, the haptic effect) can be further optimized by having the haptic parameters of the haptic primitive be automatically adjusted. For example, if audio source data 310 has a duration of 345 ms, and the haptic primitive of haptic primitive set 320 that is the most similar to audio source data 310 has a duration haptic parameter with a value of 300 ms, the duration haptic parameter can be adjusted to have a value of 345 ms, so that the haptic effect generated based on the haptic primitive is more similar to audio source data 310.

Further, in accordance with the example, matching algorithm 330 can use an envelope shape and frequency content of audio source data 310 to select a haptic primitive from haptic primitive set 320 that more closely matches audio source data 310. More specifically, matching algorithm 330 can select a haptic primitive with an envelope haptic parameter and a frequency haptic parameter, so that the haptic effect generated from the haptic primitive has an envelope and frequency similar to audio source data 310 (i.e., an impulse-like loud noise followed by a longer envelope for an echo of the gunshot, with associated frequency content). In an alternate embodiment, matching algorithm 330 can compound or combine two haptic primitives (and thus, two haptic effects) to more closely match audio source data 310. Thus, in an alternate example, matching algorithm 330 can select a first haptic primitive (and thus, a first haptic effect) to match the impulse-like loud noise, and can further select a second haptic primitive (and thus, a second haptic effect) to match the trailing echo. Matching algorithm 330 can generate a third haptic primitive that combines the first haptic primitive and the second haptic primitive (and thus, can generate a third haptic effect that combines the first haptic effect and the second haptic effect). In combining the first haptic primitive and the second haptic primitive as part of the third haptic primitive, matching algorithm 330 can further place the first haptic primitive and the second haptic primitive in a proper temporal sequence with a correct spacing between the two haptic primitives.

Another example of selecting a haptic primitive that is most similar to audio source data is now described. In the example, audio source data 310 can include audio data associated with the audio of an explosion. Further, haptic primitive set 320 can include ten haptic primitives, where each haptic primitive can be used to generate an explosion haptic effect. Matching algorithm 330 can compare audio source data 310 with each haptic primitive of haptic primitive set 320, and select the haptic primitive with a duration haptic parameter that is most similar to a duration of audio source data 310. Alternatively, matching algorithm 330 can select the haptic primitive with an amplitude haptic parameter that is most similar to an amplitude of audio source data 310. Matching algorithm 330 can then optionally optimize the selected haptic primitive by adjusting the haptic parameters of the selected haptic primitive to be more similar to the characteristics of audio source data 310. Thus, matching algorithm 330 can select the explosion haptic effect that most closely fits audio source data 310. Further, the optimized haptic primitive (i.e., the haptic primitive in which one or more haptic parameters are adjusted) can be included within haptic primitive set 320 to further improve the performance of matching algorithm 330 for subsequent matching.

Figure 4:
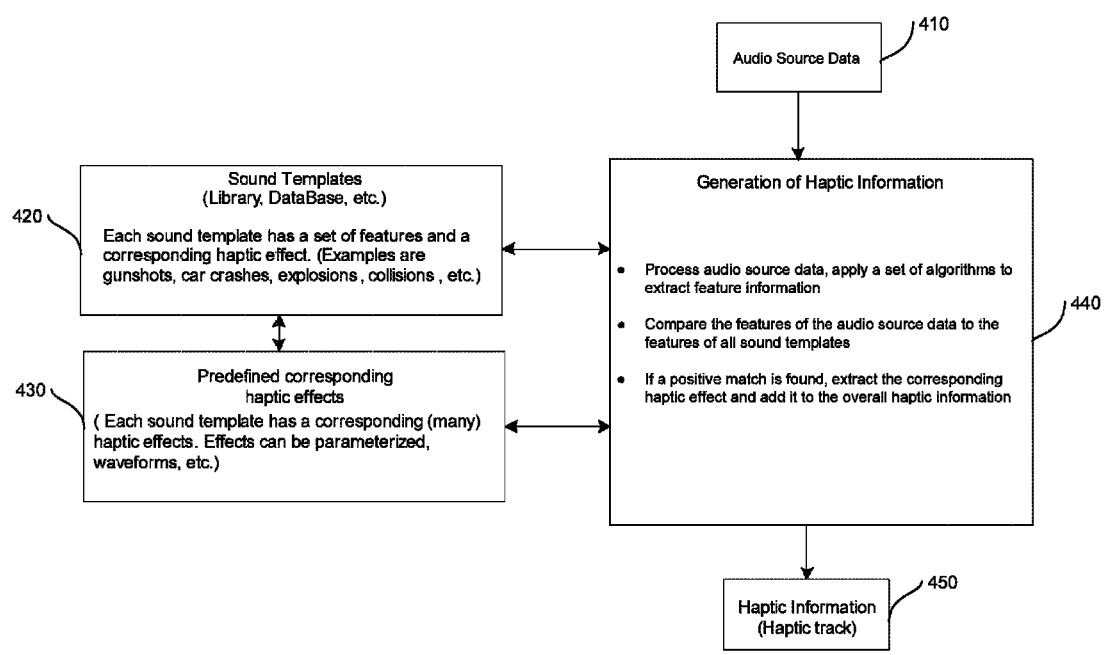
FIG. 4 illustrates a flow diagram for an audio feature extraction and a selection of a haptic effect based on the extracted audio feature, according to one embodiment of the invention.

FIG. 4 illustrates a flow diagram for an audio feature extraction and a selection of a haptic effect based on the extracted audio feature, according to one embodiment of the invention. According to the embodiment, a matching algorithm can extract a single feature (or a plurality of features) from audio source data (or other type of stream), and compare the extracted feature(s) to pre-computed templates that are deemed relevant, and where haptic effects are associated with each template.

FIG. 4 illustrates audio source data 410 that is received. According to the embodiment, audio source data 410 includes audio data. In certain embodiments, the audio data included within audio source data 410 can be audio data that is stored in either an audio file or an audio signal. In other embodiments, the audio data included within audio source data 410 can be audio data that is streamed. Further, in the illustrated embodiment, audio source data 410 is encoded in a PCM format. In certain embodiments, audio source data 410 can also be encoded in another type of format, such as a MIDI format, or an MP3 format. Further, in alternate embodiments, audio source data 410 can be replaced by another type of source data that includes another type of data, such as video source data that includes video data, acceleration source data that includes acceleration data, orientation source data that includes orientation data, ambient light source data that includes ambient light data, or another type of source data that includes another type of data. As an example of acceleration data, a controller of a device can automatically assign a haptic effect to an on-screen or free-space gesture, such as rocking the device back and forth. When the user performs the action, acceleration data associated with the action can be sent to the controller. The controller can process the acceleration data and determine that the user made several abrupt motions. The control can then select haptic effects that are most similar to the abrupt motions, such as high-frequency haptic effects. An example of another type of source data is source data that includes data that can be captured with a sensor. Further, in some embodiments, audio source data can be replaced by source data that includes multi-modal data.

Further, audio source data 410 can include features. An example of a feature is a characteristic, which is previously described above. Another example of a feature is a transition from a first characteristic to a second characteristic, such as a transaction from a high frequency to a low frequency. A feature can include a numeric value, where the numeric value can define a feature of audio source data 410.

FIG. 4 further illustrates sound template set 420. According to the embodiment, sound template set 420 includes sound templates. In certain embodiments, sound template set 420 can include a single sound template. A sound template can include template features. Similar to a feature, a template feature can be a characteristic, or alternatively, can be a transition from a first characteristic to a second characteristic. As described below in greater detail, a sound template can also be associated with corresponding haptic effects. Additionally, in certain embodiments, a sound template can be a portion of audio source data, and can include audio data. The portion of the audio source data can be a pattern that consistently occurs within audio source data. Examples of sound templates include a gunshot sound, a car crash sound, an explosion sound, a collision sound, a punch sound, an arrow sound, or another type of percussive sound. According to an embodiment, a sound template can be selected as candidates for conversion to haptic effects. In one embodiment, the sound templates of sound template set 420 can be stored in a database, or library, of templates for use at a time when audio source data, such as audio source data 410, is processed. In certain embodiments, in order to create the database, or library, where the sound templates of sound template set 420 are stored, the sound templates can be processed using one of the following techniques in order to extract template features that later can be compared to features extracted from audio source data 410: (1) a spectrogram (i.e., time vs. frequency plots of a time domain signal); (2) a cepstrum (i.e., a fast Fourier transform ("FFT") of a logarithm of a spectrum of a signal); (3) stochastic and probability models (e.g., Hidden Markov Models ("HMM")); or (4) authoring haptic parameters based on audio source data (such as audio source data 410). Audio files that are derived from a synthesis engine, sensor, or compositing tool (e.g., Protools) also can have feature information available as metadata. The techniques can be used similarly as they are used for speech recognition. However, according to the embodiments, the techniques can be used to recognize haptic-related events rather than speech. Specifically, HMM can be used to identify the sound templates of sound template set 420 within audio source data 410. Another algorithm that can be used is a neural network algorithm.

Further, in alternate embodiments, sound template set 420 can be replaced by another type of template set that includes templates of another type. One example of another type of template set is a video template set that includes video templates, where a video template can be a portion of video source data, and can include video data. Another example is an acceleration template set that includes acceleration templates, where an acceleration template can be a portion of acceleration source data, and can include acceleration data. Another example is an orientation template set that includes orientation templates, where an orientation template can be a portion of orientation source data, and can include orientation data. Another example is an ambient light template set that includes ambient light templates, where an ambient light template can be a portion of ambient light source data, and can include ambient light data. Another example is a template set that includes sensor templates, where a sensor template can include data that can be captured with a sensor. Further, in some embodiments, a template set can include templates of a plurality of types.

FIG. 4 further illustrates haptic effect set 430. According to the embodiment, haptic effect set 430 includes haptic effects. In certain embodiments, haptic effect set 430 can include a single haptic effect. Each sound template of sound template set 420 can have haptic effects of haptic effect set 430 associated with the sound template. In certain embodiments, each haptic effect of haptic effect set 430 can be assigned to sound templates of haptic effect set 430 within a database that stores sound template set 420. Thus, each sound template of sound template set 420 has haptic effects from haptic effect set 430 assigned to it. The haptic effects of haptic effect set 430 can be generated using an automatic audio-to-haptic conversion, such as the automatic audio-to-haptic conversion previously described in relation to FIG. 3. In other embodiments, the haptic effects of haptic effect set 430 can be individually designed by a haptic effect designer. In certain embodiments, the haptic effects of haptic effect set 430 can be part of the database that contains the sound templates of sound template set 420. In other embodiments, the haptic effects of haptic effect set 430 can be stored in a separate database along with indices that correspond to the corresponding sound templates of sound template set 420.

At 440, audio source data 410 is received, where audio source data 410 is selected for conversion to a single haptic effect, or a plurality of haptic effects. Audio source data 410 is processed, and one or more algorithms are applied in order to extract features from audio source data 410. The extracted features from audio source data 410 are compared to the sound templates of sound template set 420. More specifically, for each sound template of sound template set 420, the extracted features from audio source data 410 are compared to template features of that sound template. By comparing the extracted features from audio source data 410 with the template features of the sound templates of sound template set 420, sound templates (or a single sound template) can be identified as having template features that are the most similar to the extracted features from audio source data 410. In other words, sound templates (or a single sound template) can be identified as being the most similar to audio source data 410. These identified sound templates can subsequently be selected from sound template set 420. Once the identified sound templates have been selected, haptic effects associated with each selected template can also be selected from haptic effect set 430. In one embodiment, the selected haptic effects can optionally be optimized. According to the embodiment, by optimizing each selected haptic effect, a value of a single haptic parameter (or a plurality of haptic parameters) of each selected haptic effect can be adjusted to be more similar to a value of a corresponding feature of audio source data 410. The adjusting of the value(s) can be an upward adjustment or a downward adjustment. This can produce a refinement of the haptic parameter(s) of each selected haptic effect of haptic effect set 430. The refinement of the haptic parameter(s) can, thus, refine each selected haptic effect of haptic effect set 430, so that each selected haptic effect is more similar to audio source data 430. Once the haptic effects have been selected, the haptic effects can be used to generate haptic information 450. Haptic information 450 is a collection of the selected haptic effects that can subsequently be output. In one embodiment, haptic information 450 can take the form of haptic data, a haptic track, or a haptic stream. In certain embodiments, haptic information 450 can be encoded according to any haptic encoding technique that is known to one of ordinary skill in the art. Haptic information 450 can subsequently be transmitted, stored, or broadcast. Subsequently, haptic information 450 can be output. In alternate embodiments, haptic information 450 can be output after it is generated.

Thus, by storing haptic effects, associating the haptic effects with a sound template, and comparing audio source data with the sound template, the association between the haptic effect and the sound template can be reused to further enhance or optimize the automatic conversion of audio data into a haptic effect.

Figure 5:
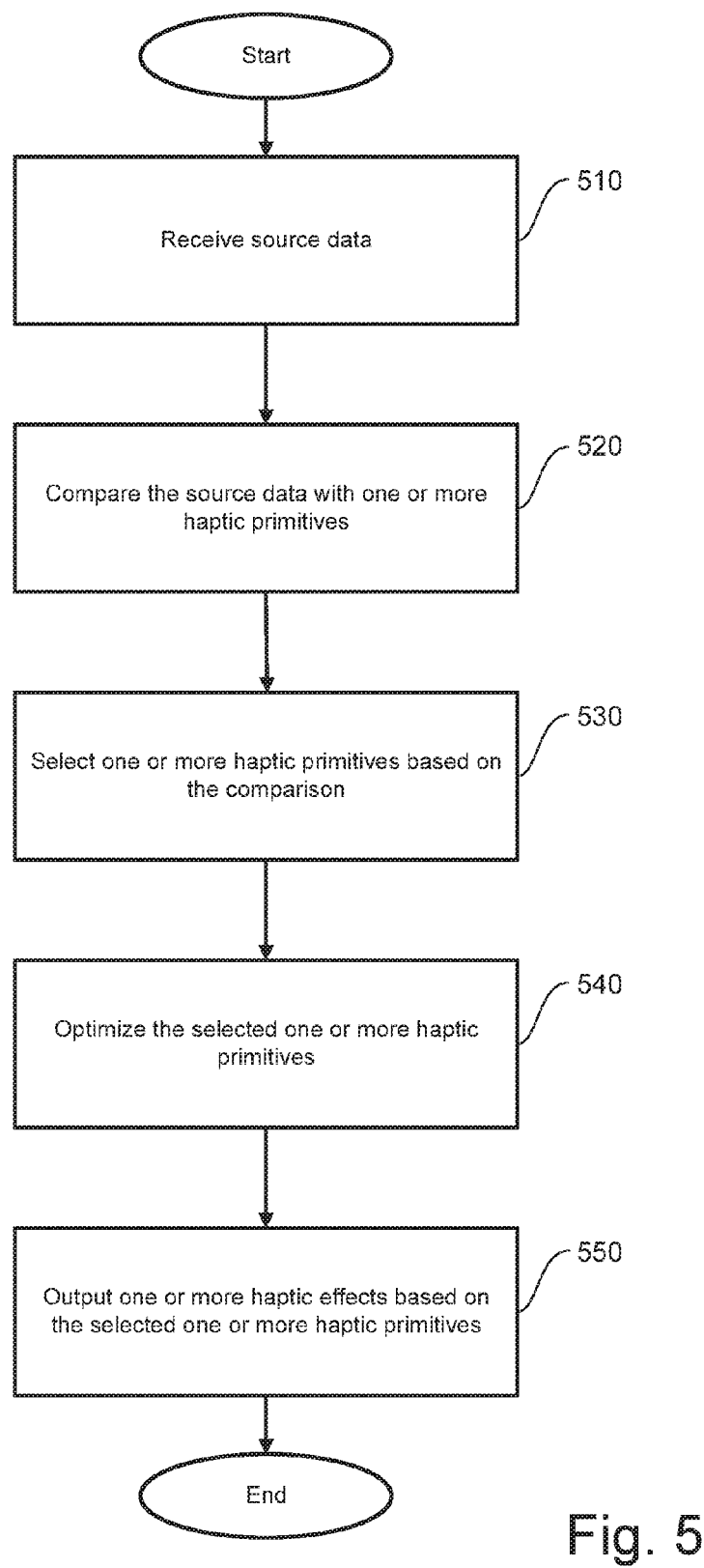
FIG. 5 illustrates a flow diagram of the functionality of an automatic haptic effect fitting module, according to one embodiment of the invention.

FIG. 5 illustrates a flow diagram of the functionality of an automatic haptic effect fitting module (such as automatic haptic effect fitting module 16 of FIG. 1), according to one embodiment of the invention. The flow begins and proceeds to 510. At 510, source data is received, where the source data includes one or more characteristics. In certain embodiments, the source data includes audio source data. In some of these embodiments, the audio source data is encoded in a PCM format. In embodiments where the source data includes audio source data, the audio source data includes audio data, where the audio data can be stored in an audio file or an audio signal. In other embodiments, the source data includes video source data. In yet other embodiments, the source data includes acceleration source data. In yet other embodiments, the source data includes orientation source data. In yet other embodiments, the source data includes ambient light source data. In yet other embodiments, the source data includes multi-modal source data. Further, in certain embodiments, the one or more characteristics of the source data include at least one of: an amplitude, a frequency, a duration, an envelope, a density, a magnitude, or a strength. The flow proceeds to 520.

At 520, the source data is compared with one or more haptic primitives, where each haptic primitive includes one or more haptic parameters. In certain embodiments, the comparing further includes comparing the one or more characteristics of the source data with the one or more haptic parameters of each haptic primitive. In certain embodiments, the one or more haptic parameters include at least one of: an amplitude haptic parameter, a frequency haptic parameter, a duration haptic parameter, an envelope haptic parameter, a density haptic parameter, a magnitude haptic parameter, or a strength haptic parameter. The flow proceeds to 530.

At 530, one or more haptic primitives are selected based on the comparison performed at 520. In certain embodiments, the selecting includes selecting the one or more haptic primitives in which values of the one or more haptic parameters are most similar to values of the one or more characteristics of the source data. The flow proceeds to 540.

At 540, the selected one or more haptic primitives are optimized. In certain embodiments, the selected one or more haptic primitives are optimized to be more similar to the source data. In some of these embodiments, the optimizing includes adjusting a value of at least one haptic parameter of each selected haptic primitive to be more similar to a value of a corresponding characteristic of the source data. In certain embodiments, 540 is omitted. The flow proceeds to 550.

At 550, one or more haptic effects are output based on the selected one or more primitives. In certain embodiments, before the one or more haptic effects are output, the one or more haptic effects can be encoded and/or stored in a storage, such as file. Subsequently, in these embodiments, the one or more haptic effects can be retrieved and/or decoded, before they are output. The flow then ends.

Figure 6:
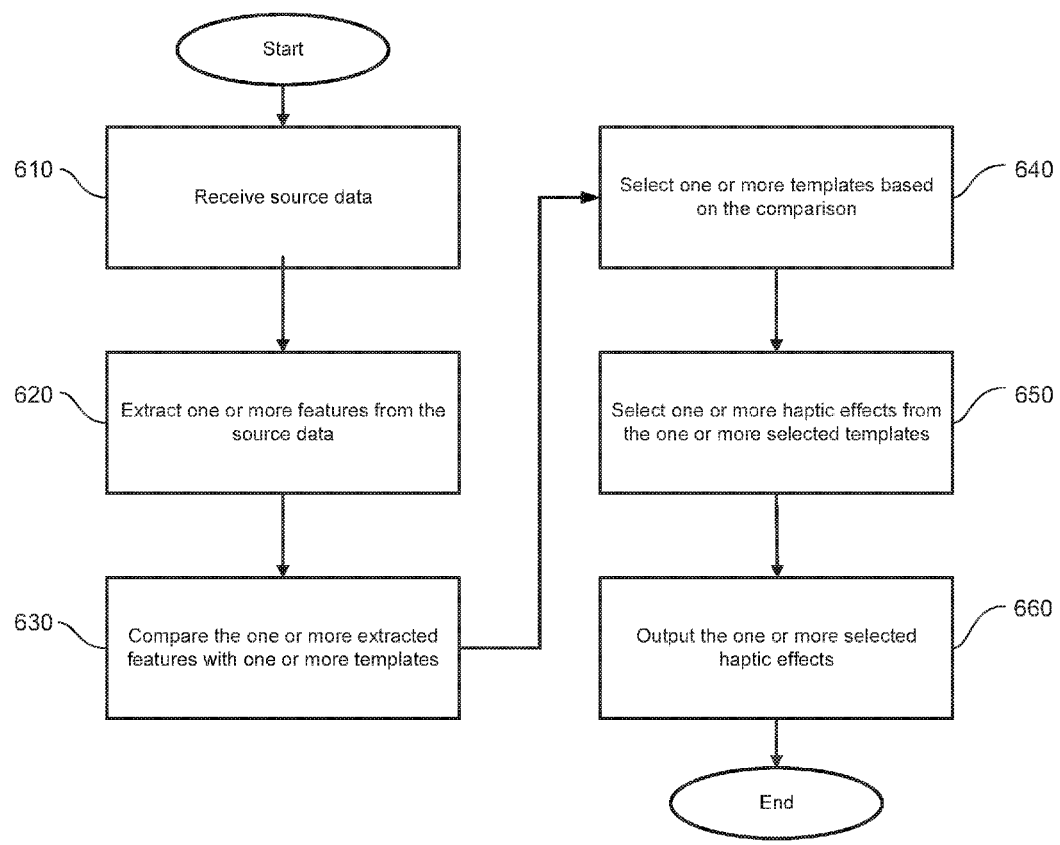
FIG. 6 illustrates a flow diagram of the functionality of an automatic haptic effect fitting module, according to another embodiment of the invention.

FIG. 6 illustrates a flow diagram of the functionality of an automatic haptic effect fitting module (such as automatic haptic effect fitting module 16 of FIG. 1), according to another embodiment of the invention. The flow begins and proceeds to 610. At 610, source data is received, where the source data includes one or more features. In certain embodiments, the source data includes audio source data. In some of these embodiments, the audio source data is encoded in a PCM format. In embodiments where the source data includes audio source data, the audio source data includes audio data, where the audio data can be stored in an audio file or an audio signal. In other embodiments, the source data includes video source data. In yet other embodiments, the source data includes acceleration source data. In yet other embodiments, the source data includes orientation source data. In yet other embodiments, the source data includes ambient light source data. In yet other embodiments, the source data includes multi-modal source data. The flow proceeds to 620.

At 620, one or more features are extracted from the source data. The flow proceeds to 630.

At 630, the one or more extracted features are compared with one or more templates, where each template includes one or more template features and one or more haptic effects. In certain embodiments, the one or more templates include one or more sound templates. In alternate embodiments, the one or more templates include one or more video templates. In other alternate embodiments, the one or more templates include one or more acceleration templates. In certain embodiments, the comparing includes comparing each extracted feature of the source data with each template feature of the one or more templates. The flow proceeds to 640.

At 640, one or more templates are selected from the one or more templates based on the comparison performed at 630. In certain embodiments, the selecting includes selecting the one or more templates in which the one or more template features are most similar to the one or more extracted features of the source data. The flow proceeds to 650.

At 650, one or more haptic effects are selected from the one or more selected templates. The flow proceeds to 650.

At 660, the one or more selected haptic effects are output. In certain embodiments, before the one or more selected haptic effects are output, the one or more selected haptic effects can be encoded and/or stored in a storage, such as file. Subsequently, in these embodiments, the one or more selected haptic effects can be retrieved and/or decoded, before they are output. The flow then ends.

Thus, according to an embodiment, a system is provided that can analyze a source data, such as audio source data, and can identify one or more haptic effects that are the most similar to the source data. The system can then match the identified one or more haptic effects with the source data. The system can subsequently output the identified one or more haptic effects. Through this technique, the system can utilize source data, such as audio source data, before the source data has been mixed. By utilizing source data earlier in the process, before the source data has been mixed, the system can increase an appropriateness and quality of a haptic effect that can be added to the overall content. Further, the system can be very valuable for haptic effect design in games and other content that have effects, such as audio effects, and haptic effects playing simultaneously. The system can provide an easy way for content producers to identify appropriate haptic content and customize the haptic content for their game or experience.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to automatically fit a haptic effect, the automatic fitting comprising:

receiving a first stream of source data and a second stream of source data;

comparing the source data of the first stream and the source data of the second stream with a plurality of haptic effect definitions;

selecting a first haptic effect definition for the source data of the first stream, and a second haptic effect definition for the source data of the second stream from the plurality of haptic effect definitions based on the comparisons, wherein the source data of the first stream is mixed with the source data of the second stream; and outputting a plurality of haptic effects based on the first and second haptic effect definitions.

2. The non-transitory computer-readable medium of claim 1, wherein a haptic effect definition comprises an amplitude haptic parameter.

3. The non-transitory computer-readable medium of claim 2, the selecting further comprising selecting a haptic effect definition in which a value of the amplitude haptic parameter is most similar to a value of an envelope of the source data.

4. The non-transitory computer-readable medium of claim 3, further comprising optimizing the selected haptic effect definition by adjusting a value of the amplitude haptic parameter of the selected haptic effect definition relative to a value of the envelope of the source data.

5. The non-transitory computer-readable medium of claim 1, wherein the first stream of source data comprises audio source data.

6. The non-transitory computer-readable medium of claim 5, wherein the audio source data is encoded in a pulse code modulation format.

7. The non-transitory computer-readable medium of claim 5, wherein the audio source data comprises audio data that is stored in one of an audio file or an audio signal.

8. The non-transitory computer-readable medium of claim 1, wherein the first stream of source data comprises at least one of: video source data, acceleration source data, orientation source data, ambient light source data, or multi-modal source data.

9. The non-transitory computer-readable medium of claim 1, the automatic fitting further comprising extracting an envelope from the source data.

10. A computer-implemented method for automatically fitting a haptic effect, the computer-implemented method comprising:

receiving a first stream of source data and a second stream of source data;

comparing the source data of the first stream and the source data of the second stream with a plurality of haptic effect definitions;

selecting a first haptic effect definition for the source data of the first stream, and a second haptic effect definition for the source data of the second stream from the plurality of haptic effect definitions based on the comparisons, wherein the source data of the first stream is mixed with the source data of the second stream; and outputting a plurality of haptic effects based on the first and second haptic effect definitions.

11. The computer-implemented method of claim 10, wherein a haptic effect definition comprises an amplitude haptic parameter.

12. The computer-implemented method of claim 11, the selecting further comprising selecting a haptic effect definition in which a value of the amplitude haptic parameter is most similar to a value of an envelope of the source data.

13. The computer-implemented method of claim 12, further comprising optimizing the selected haptic effect definition by adjusting a value of the amplitude haptic parameter of the selected haptic effect definition relative to a value of the envelope of the source data.

14. The computer-implemented method of claim 10, wherein the first stream of source data comprises audio source data.

15. The computer-implemented method of claim 10, further comprising extracting an envelope from the source data.

16. A system for automatically fitting a haptic effect, the system comprising:

a communications device configured to receive a first stream of source data and a second stream of source data;

a memory configured to store an automatic haptic effect fitting module; and a processor configured to execute the automatic haptic effect fitting module stored on the memory;

wherein the automatic haptic effect fitting module is configured to compare the source data of the first stream and the source data of the second stream with a plurality of haptic effect definitions, wherein the automatic haptic effect fitting module is further configured to select a first haptic effect definition for the source data of the first stream, and a second haptic effect definition for the source data of the second stream, from the plurality of haptic effect definitions based on the comparisons, wherein the source data of the first stream is mixed with the source data of the second stream, and wherein the automatic haptic effect fitting module is further configured to output a plurality of haptic effects based on the first and second haptic effect definitions.

17. The system of claim 16, wherein a haptic effect definition comprises an amplitude haptic parameter.

18. The system of claim 17, wherein the automatic haptic effect fitting module is further configured to select a haptic effect definition in which a value of the amplitude haptic parameter is most similar to a value of an envelope of the source data.

19. The system of claim 17, wherein the automatic haptic effect fitting module is further configured to adjust a value of the amplitude haptic parameter of the selected haptic effect definition relative to a value of the envelope of the source data.

20. The system of claim 16, wherein the automatic haptic effect fitting module is further configured to extract an envelope from the source data.

* * * * *

UNITED STATES PATENT AND TRADEMARK OFFICE
CERTIFICATE OF CORRECTION

PATENT NO. : 9,905,090 B2
APPLICATION NO. : 15/240560
DATED : February 27, 2018
INVENTOR(S) : Christopher J. Ullrich et al.

It is certified that error appears in the above-identified patent and that said Letters Patent is hereby corrected as shown below:

In the Claims

Column 17, Line 16 (Claim 4): "a value" should be corrected to --the value--.

Column 18, Line 49 (Claim 19): "the envelope" should be corrected to --an envelope--.

Signed and Sealed this
First Day of May, 2018

Andrei Iancu
*Director of the United States Patent and Trademark Office*